(12) United States Patent
Besier et al.

(10) Patent No.: US 11,066,055 B2
(45) Date of Patent: Jul. 20, 2021

(54) BRAKING SYSTEM FOR A MOTOR VEHICLE

(71) Applicant: Continental Teves AG & Co. oHG, Frankfurt (DE)

(72) Inventors: Marco Besier, Bad Schwalbach (DE); Stefan Drumm, Saulheim (DE)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 15/378,464

(22) Filed: Dec. 14, 2016

(65) Prior Publication Data

US 2017/0129468 A1  May 11, 2017

Related U.S. Application Data

(63) Continuation of application No. PCT/EP2015/060176, filed on May 8, 2015.

(30) Foreign Application Priority Data

Jun. 30, 2014  (DE) ...................... 10 2014 212 537.5

(51) Int. Cl.
*B60T 13/68* (2006.01)
*B60T 8/40* (2006.01)
*B60T 8/32* (2006.01)

(52) U.S. Cl.
CPC .......... *B60T 8/4077* (2013.01); *B60T 8/4086* (2013.01); *B60T 8/321* (2013.01); *B60T 2270/413* (2013.01)

(58) Field of Classification Search
CPC .... B60T 13/745; B60T 13/662; B60T 13/686; B60T 8/4077; B60T 8/4827; B60T 8/88;
(Continued)

(56) References Cited

U.S. PATENT DOCUMENTS

2001/0035679 A1* 11/2001 Riddiford ............... B60T 7/042
                                                              303/155
2002/0050739 A1*  5/2002 Koepff ................. B60T 13/686
                                                              303/122.09
(Continued)

FOREIGN PATENT DOCUMENTS

CN         103029698 A      4/2013
CN         103492247 A      1/2014
(Continued)

OTHER PUBLICATIONS

International Search Report and Written Opinion dated Jul. 20, 2015 from corresponding International Patent Application No. PCT/EP2015/060176.
(Continued)

*Primary Examiner* — Bradley T King
*Assistant Examiner* — Stephen M Bowes

(57) ABSTRACT

A braking system for a motor vehicle for actuating hydraulically actuatable wheel brakes comprises a first and a second electrically controllable pressure source for providing a brake pressure for actuating the wheel brakes. A first electric energy supply unit and a second electric energy supply unit that is independent of the first electric energy supply unit are provided. An electrically controllable pressure modulation device for setting brake pressures that are individual to each of the wheel brakes has at least one electrically actuatable inlet valve for each wheel brake. The first pressure source can be supplied with electric energy by the first energy supply unit, the second pressure source can be supplied with electric energy by the second energy supply unit, and the pressure modulation device can be supplied with electric energy by the first energy supply unit and by the second energy supply unit.

12 Claims, 2 Drawing Sheets

(58) Field of Classification Search
CPC .......... B60T 8/92; B60T 8/94; B60T 227/402; B60T 227/403; B60T 227/406; B60T 227/414
See application file for complete search history.

(56) References Cited

U.S. PATENT DOCUMENTS

| | | | |
|---|---|---|---|
| 2006/0212135 A1* | 9/2006 | Degoul | B60T 8/321 700/9 |
| 2007/0152500 A1* | 7/2007 | Wakabayashi | B60T 7/22 303/155 |
| 2008/0296106 A1* | 12/2008 | Nilsson | B60T 8/321 188/156 |
| 2010/0243388 A1* | 9/2010 | Holzwarth | B60T 8/885 188/158 |
| 2011/0316329 A1* | 12/2011 | Nishino | B60T 7/042 303/14 |
| 2011/0320099 A1* | 12/2011 | Kim | B60T 8/885 701/70 |
| 2014/0203626 A1* | 7/2014 | Biller | B60T 8/4081 303/10 |
| 2019/0308596 A1* | 10/2019 | Besier | B60T 8/94 |

FOREIGN PATENT DOCUMENTS

| | | | | |
|---|---|---|---|---|
| DE | 102008060029 A1 * | 6/2010 | | B60T 7/042 |
| DE | 102008060029 A1 | 6/2010 | | |
| DE | 102011081461 A1 | 3/2012 | | |
| DE | 102011084206 A1 * | 4/2012 | | B60T 7/042 |
| DE | 102011084206 A1 | 4/2012 | | |
| DE | 102012201535 A1 | 10/2012 | | |
| DE | 102012020322 A1 | 4/2014 | | |
| DE | 102013225809 A1 | 8/2014 | | |
| JP | 2009227093 A | 10/2009 | | |
| WO | WO2012028521 A1 | 3/2012 | | |
| WO | WO-2012143313 A1 * | 10/2012 | | B60T 8/4081 |
| WO | WO2012150120 A1 | 11/2012 | | |

OTHER PUBLICATIONS

German Search Report dated Apr. 20, 2015 for corresponding German Patent Application No. 10 2014 212 537.5.
China Office Action dated Aug. 5, 2018 for corresponding Chinese Patent Application No. 201580034854.4.

* cited by examiner

BRAKING SYSTEM FOR A MOTOR VEHICLE

CROSS REFERENCE TO RELATED APPLICATIONS

This U.S. patent application claims the benefit of PCT patent application No. PCT/EP2015/060176, filed May 8, 2015, which claims the benefit of German patent application No. 10 2014 212 537.5, filed Jun. 30, 2014, both of which are hereby incorporated by reference.

TECHNICAL FIELD

The invention concerns a braking system for a motor vehicle.

BACKGROUND

In motor vehicle technology, "brake-by-wire" braking systems are becoming ever more widespread. Such braking systems often comprise, besides a master brake cylinder that can be operated by the driver of the vehicle, an electrically controllable pressure supply device, by means of which the hydraulic pressure for operation of the wheel brakes is built up in the "brake-by-wire" operating mode. The existence of a "brake-by-wire" operating mode of the braking system is the prerequisite for automated driving, during which an electronic autopilot function steers, accelerates and brakes the vehicle either fully automatically or in cooperation with the driver.

In order to meet the safety requirements for automated driving, in particular performing braking without operation of the brake pedal by the driver, even in the event of a failure of the electrically controllable pressure supply device, a second, independent device for the electrically controllable supply of brake pressure is necessary.

From DE 10 2011 084 206 A1, a braking system for motor vehicles is known with a master brake cylinder that can be electrically operated by an electrohydraulic actuator, a motor-pump assembly and a wheel brake pressure modulation unit with an inlet valve and an outlet valve per wheel brake. Two electronic control and regulating units are provided, wherein the first control and regulating unit is used for actuating the motor-pump assembly and the wheel brake pressure modulation unit and the second control and regulating unit is used for actuating the electrohydraulic actuator for operating the master brake cylinder. Furthermore, two separate power supplies are provided, wherein the first power supply supplies the first control and regulating unit with electrical energy and the second power supply supplies the second control and regulating unit with electrical energy. In the event of a failure of the first power supply, only a uniform brake pressure build-up or reduction on all wheel brakes is possible by means of the electrohydraulic actuator. The setting of wheel-specific brake pressures, in particular anti-lock braking control (ABS: Anti-lock Braking System) or driving dynamics control (ESC: Electronic Stability Control) or another stabilizing assistance function of the braking system, is not possible in the known braking system in this case.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

It is therefore the object of the present invention to provide a braking system for a motor vehicle that meets the safety requirements for automated driving.

A braking system is provided with improved availability of assistance functions with wheel-specific brake pressure regulation or control. The first pressure source can be supplied with electrical energy by a first power supply unit, the second pressure source can be supplied with electrical energy by a second power supply unit that is independent of the first power supply unit and the pressure modulation device can be supplied with electrical energy by the first power supply unit and the second power supply unit.

Following a failure of one of the power supply units, one of the pressure sources as well as the pressure modulation device can always still be supplied with electrical energy in order to enable wheel-specific brake pressure regulation and thereby safe braking to be carried out. The pressure modulation device has at least one electrically operated inlet valve for each wheel brake. Preferably, an electrically operated inlet valve and an electrically operated outlet valve are provided for each wheel brake. Wheel-specific brake pressures are derived by means of the pressure modulation device from the brake pressure provided from the first pressure source or the brake pressure provided from second pressure source or the brake pressure provided by means of both pressure sources.

The second pressure source is hydraulically disposed between the first pressure source and the pressure modulation device. This enables boosting of the pressure output by the first pressure source to be carried out when required.

The first pressure source can be exclusively supplied with electrical energy by the first power supply unit and the second pressure source can be exclusively supplied with electrical energy by the second power supply unit. This achieves a smaller number of supply lines from the power supply units to the pressure sources compared to a braking system in which at least one of the two pressure sources can be supplied by the first and the second power supply units.

According to an embodiment, the braking system comprises a first electronic control and regulating unit associated with the first pressure source for actuating the first pressure source, a second electronic control and regulating unit associated with the second pressure source for actuating the second pressure source and a third electronic control and regulating unit associated with the pressure modulation device for actuating the pressure modulation device. Owing to the separately implemented third control and regulating unit for the pressure modulation device, the increased availability of wheel-specific brake pressure regulation functions can be achieved.

The pressure modulation device can be implemented as a standalone hydraulic unit. The pressure modulation device and the third electronic control and regulating unit are implemented as an electrohydraulic control unit.

According to an embodiment of the braking system, the first electronic control and regulating unit can be supplied with electrical energy by the first power supply unit, the second electronic control and regulating unit can be supplied with electrical energy by the second power supply unit and the third electronic control and regulating unit can be supplied with electrical energy by the first power supply unit and by the second power supply unit. Following a failure of the first or the second control and regulating unit, one of the pressure sources as well as the pressure modulation device can always still be supplied with electrical energy, in order to thus be able to carry out wheel-specific brake pressure regulation and thereby safe braking.

The first and the second pressure sources and the pressure modulation device are supplied with electrical energy by the electronic control and regulating unit associated therewith.

In order to be able to implement anti-lock braking controls, the braking system comprises or is connected to wheel revolution rate sensors, wherein the signals of the wheel revolution rate sensors are delivered to the third control and regulating unit. The processing of the signals is carried out in the third control and regulating unit, so that the necessary data for actuating the pressure modulation device during wheel-specific brake pressure regulation are also available in the event of a failure of the first or second control and regulating unit.

The braking system may additionally comprises or is connected to a sensor device for detecting driving dynamics variables, wherein the signals of the sensor device are delivered to the third control and regulating unit, which is associated with the pressure modulation device. The processing of the signals is particularly preferably carried out in the third control and regulating unit. This enables driving dynamic, wheel-specific brake pressure regulation, even in the event of a failure of the first or second control and regulating unit.

The sensor device preferably comprises at least one sensor for detecting the yaw rate of the motor vehicle, at least one sensor for detecting the lateral acceleration of the motor vehicle and/or a sensor for detecting the longitudinal acceleration of the motor vehicle.

The first, the second and the third control and regulating units are preferably connected to each other by data buses.

In order to carry out automated driving, according to a development of the braking system at least one of the three control and regulating units is or can be connected to a fourth electronic control and regulating unit by a data communications path in which an autopilot function is carried out.

In order to be able to carry out an independent pressure build-up by each of the two pressure sources, at least the first and the second control and regulating units are or can be connected to the fourth control and regulating unit by means of a respective data communications path. However, each of the three control and regulating units is or can be connected to the fourth control and regulating unit by means of one data communications path. The data communications path consists of a data bus.

According to an embodiment of the braking system, the second pressure source comprises a motor-pump assembly with an at least dual-circuit hydraulic pump. Such assemblies have been known for a long time and can produce high pressures and can be implemented in very compact sizes.

Furthermore, the second pressure source preferably comprises electrically operated valves for setting the brake pressure or the brake pressures that is or are redirected to the pressure modulation device. Valves are also provided that enable the separation of the connection between the first pressure source and the pressure modulation device.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
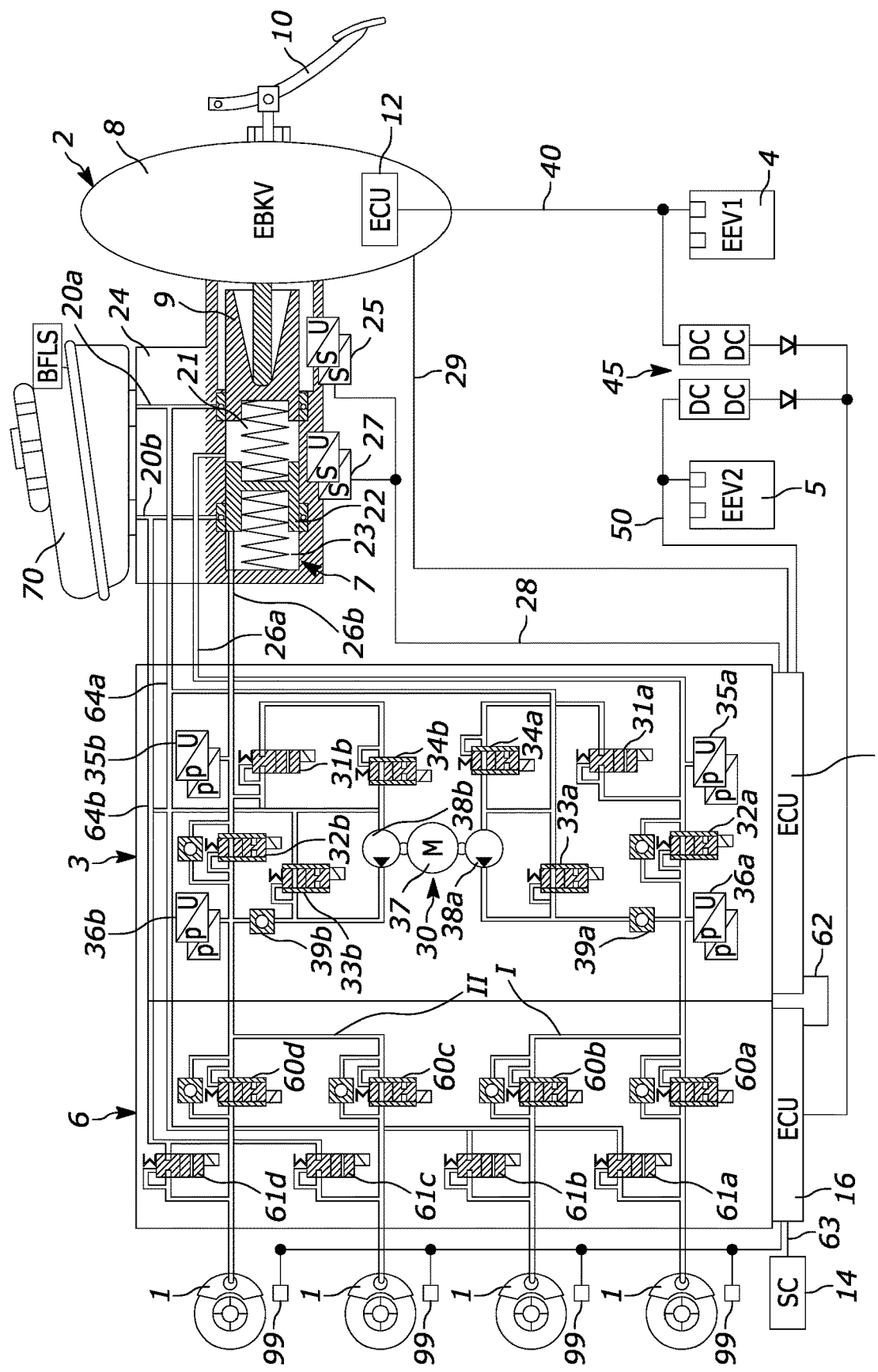
FIG. 1 shows a first exemplary embodiment of a braking system.

The braking system according to the example according to FIG. 1 essentially comprises a first electrically controllable pressure source 2 for the provision of a brake pressure for the operation of the wheel brakes 1 of a motor vehicle that is not shown, a second electrically controllable pressure source 3 for the provision of a brake pressure for the operation of the wheel brakes 1, an electrically controllable pressure modulation device 6 for setting wheel-specific brake pressures for the wheel brakes 1, a first, a second and a third electronic control and regulating unit (ECU) 12, 13, 16 as well as a first electrical power supply unit 4 and a second electrical power supply unit 5 that is independent of the first electrical power supply unit.

The first electronic control and regulating unit 12 is associated with the first pressure source 2 and is used for actuating the first pressure source 2. The second electronic control and regulating unit 13 is associated with the second pressure source 3 and is used for actuating the second pressure source 3 and the third electronic control and regulating unit 16 is associated with the pressure modulation device 6 and is used for actuating the pressure modulation device 6.

The first electrically controllable pressure source 2 comprises a dual circuit master brake cylinder 7 with two pistons 9, 22 that are disposed one after the other and that bound two hydraulic pressure chambers 21, 23. On the one hand, the pressure chambers 21, 23 are connected by means of radial bores formed in the pistons 9, 22 as well as corresponding pressure equalization lines 20a, 20b to a pressure medium reservoir container 70 that is under atmospheric pressure, wherein said connection can be shut off by a relative displacement of the pistons 9, 22 in the housing 24. On the other hand, each of the pressure chambers 21 or 23 is connected to the pressure modulation device 6 by means of a hydraulic connection 26a or 26b. The pressure chambers 21, 23 accommodate unspecified restoring springs, which position the pistons 9, 22 in an initial position when the master brake cylinder 7 is not operated.

Furthermore, the first controllable pressure source 2 comprises an electrically controllable brake force booster 8 that is connected upstream of the master brake cylinder 7. According to the example, the brake force booster 8 comprises an electrically controllable electromechanical actuator that is not shown in detail, by means of which the piston 9 of the master brake cylinder 7 can be operated.

The operation of the brake pedal 10 of the braking system is detected for example by means of a travel sensor or an angle sensor that is not shown, for example in the brake force booster 8, and the sensor signal is redirected to the first electronic control and regulating unit 12, which is associated with the first pressure source 2.

If boosted braking is to be carried out, the control and regulating unit 12 actuates the electromechanical actuator of the brake force booster 8. According to the example, the electromechanical actuator comprises an electric motor and a rotation-translation gearbox, by means of which the desired operating force can be exerted on the piston 9 of the master brake cylinder 7.

Between the first and the second control and regulating units 12, 13 there is a signal or data line 29, by means of which the first control and regulating unit 12 can transmit a condition status for the first pressure source to the second control and regulating unit 13. For example, in the event of a fault in the first pressure source 2, the first control and regulating unit 12 can transmit a fault message to the second control and regulating unit 13. Alternatively or additionally, the first control and regulating unit 12 can transmit an "in order" signal to the second control and regulating unit 13 if the first pressure source is operational. In both cases, using the transmitted condition status of the first pressure source, the second control and regulating unit 13 can detect whether the second pressure source 3 should be actuated for operation of the wheel brakes.

Owing to the hydraulic series connection of the two pressure sources, a build-up of the pressure at the pressure modulation device (so-called modulator inlet pressure) is guaranteed even if the first pressure supply is not operationally ready, for example as a result of a failure of the first electrical power supply, and the first control and regulating unit 12 also sends no corresponding fault signal. For said case, for the independent operation of the wheel brakes and suitable actuation of the second pressure source 3, advantageously two further independent displacement sensors 25 and 27 are provided, which for example detect a displacement of the pistons 9 and 22, and the signals of which are transmitted to the second electronic control and regulating unit 13, which is associated with the second pressure source 3, by means of a signal or data line 28.

According to the example, the second electrically controllable pressure source 3 is implemented as a standalone hydraulic unit, which is hydraulically disposed between the first pressure source 2 and the pressure modulation device 6.

The hydraulic unit 3 and the electronic unit are preferably implemented as an electrohydraulic control unit (HECU).

Pressure source 3 essentially comprises an electrically controllable pressure supply device 30, which according to the example is implemented as a dual circuit motor-pump assembly, as well as electrically operated valves 31a, 32a, 33a, 34a, 31b, 32b, 33b, 34b for setting the brake pressure of each brake circuit or of each hydraulic line 26a or 26b that is redirected to the pressure modulation device 6. Other embodiments of the second pressure source are possible, for example with a different pressure supply device and/or a different valve combination.

According to the example, the motor-pump assembly 30 comprises two pumps 38a, 38b that are driven in common by an electric motor 37. The motor-pump assembly is preferably in the form of a type of piston pump driven by the electric motor by means of a cam, a type of construction of which millions are already used as recirculation pumps in known brake systems. These can produce particularly high system pressures and can be implemented in very compact sizes.

According to the example, four electrically operated valves 31a, 32a, 33a, 34a, or 31b, 32b, 33b, 34b as well as two pressure sensors 35a, 36a or 35b, 36b are provided for each brake circuit.

A respective normally open, advantageously analog actuated pressure relief valve 32a, 32b, by means of which the hydraulic connection between the master brake cylinder pressure chamber 21, 23 and the pressure modulation device 6 can be disconnected, is disposed in each of the connections 26a, 26b. An unspecified non-return valve that opens towards the pressure modulation device 6 is connected in parallel with each pressure relief valve 32a, 32b. The pressure upstream and downstream of the pressure relief valve 32a, 32b is measured by means of the pressure sensors 35a, 36a or 35b, 36b.

In each brake circuit the suction port of the pump 38a, 38b is connected to a recirculation line 64a, 64b leading to the pressure medium reservoir container 70, so that pressure medium can be sucked out of the pressure medium reservoir container 70. The respective pressure port of the pump 38a, 38b is connected to the associated input port of the pressure modulation device by means of a non-return valve 39a, 39b opening towards the pressure modulation device 6. The pump 38a, 38b is in each case connected in parallel with a normally open, advantageously analog actuated pressure relief valve 33a, 33b. Furthermore, the suction port of the pump 38a, 38b is in each case connected by means of a hydraulic connection to the region of the connection 26a, 26b on the master brake cylinder pressure chamber side, wherein a series connection of a normally closed reduction-release valve 31a, 31b and the normally open, advantageously analog actuated reduction-metering valve 34a, 34b is provided in the hydraulic connection from the connection 26a, 26b.

The pressure modulation device 6 is implemented as a standalone hydraulic unit and according to the example comprises for each wheel brake 1 an inlet valve 60a-60d and an outlet valve 61a-61d that are hydraulically connected to each other in pairs by means of center connections and are connected to the wheel brake 1. The input ports of the inlet valves 60a-60d are supplied with a pressure from the second pressure source 3 for each brake circuit I, II (modulator inlet pressure). With the pressure source 3 not activated, said pressures correspond to the master brake cylinder pressures. In each case an unspecified non-return valve opening towards the second pressure source 3 is connected in parallel with the inlet valves 60a-60d. The output ports of the outlet valves 61a, 61b; 61c, 61d of each brake circuit are connected to the pressure medium reservoir container 70 by means of the associated recirculation lines 64a, 64b. A different implementation of the pressure modulation device 6 is possible in principle.

The third electronic control and regulating unit 16 associated with the pressure modulation device is connected to the second electronic control and regulating unit 13 by means of a signal or data line 62, for example a data bus. The third control and regulating unit 16 can thus request an additional pressure build-up from the second control and regulating unit 13 (for example for the ESC function).

The hydraulic unit 6 and the electronic unit are preferably implemented as an electrohydraulic control unit (HECU).

The first pressure source 2 is supplied with electrical energy by means of a supply line 40 from the first power supply unit 4 and the second pressure source 3 is supplied with electrical energy from the second power supply unit 5 by means of a supply line 50. For supplying the pressure modulation device 6 with electrical energy, means 45 are provided, using which the pressure modulation device 6 can be supplied by the first power supply unit 4, by the second power supply unit 5 or by both power supply units. In this case, a switchable current or voltage supply can be used for example, so that the pressure modulation device 6 is optionally supplied from the first power supply unit 4 or the second power supply unit 5.

In order to be able to implement anti-lock braking control, according to the example the braking system comprises a wheel revolution rate sensor 99 for each wheel of the motor vehicle. So that the signals of the wheel revolution rate sensors 99 are available for anti-lock braking control, even in the event of a failure of one of the power supply units 4, 5 or in the event of a failure of one of the control and regulating units 12, 13, the signals of the wheel revolution rate sensors 99 are delivered to the control and regulating unit 16 of the pressure modulation device 6. According to the example, the wheel revolution rate signals are processed and analyzed in the control and regulating unit 16. The wheel revolution rate sensors 99 are advantageously supplied with electrical energy from the control and regulating unit 16.

In order to be able to implement a driving dynamics control function or a stabilizing assistance function, according to the example the braking system further comprises a sensor device 14 for detecting driving dynamics variables, the signals of which are delivered to the control and regulating unit 16 of the pressure modulation device 6 by means of a signal or data line 63, implemented for the same reasons as above, and are preferably also processed and analyzed there. The sensor device 14 is advantageously supplied with electrical energy from the control and regulating unit 16.

According to the example, the sensor device 14 comprises a sensor for detecting the yaw rate of the motor vehicle and a sensor for detecting the lateral acceleration of the motor vehicle. Sensor device 14 also comprises a sensor for detecting the longitudinal acceleration of the motor vehicle. Furthermore, the sensor device 14 preferably comprises a steering angle sensor or a steering wheel angle sensor.

Figure 2:
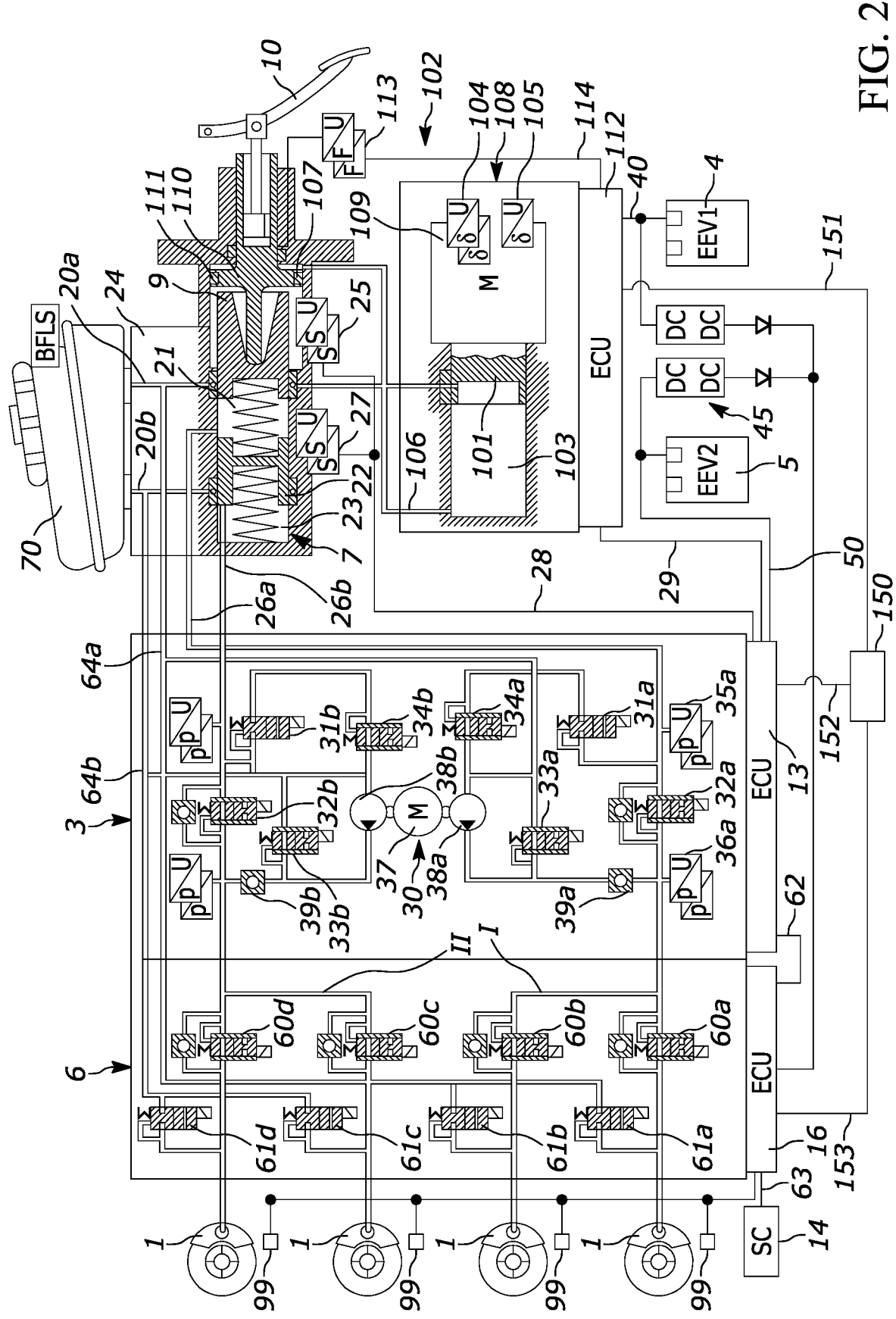
FIG. 2 shows a second exemplary embodiment of a braking system.

A second exemplary embodiment of a braking system according to the invention is schematically represented in FIG. 2.

The braking system differs from the first exemplary embodiment shown in FIG. 1 essentially by the implementation of the first pressure source. Matching elements are therefore provided with the same reference characters in F.1 and 2.

According to the second exemplary embodiment, the braking system essentially comprises a first electrically controllable pressure source 102 and a second electrically controllable pressure source 3 for the provision of a brake pressure for the operation of the wheel brakes 1, an electrically controllable pressure modulation device 6 for setting wheel-specific brake pressures for the wheel brakes 1, a first electronic control and regulating unit 112 associated with the first pressure source 102, a second electronic control and regulating unit 13 associated with the second pressure source 3 and a third electronic control and regulating unit 16 associated with the pressure modulation device 6 as well as a first electrical power supply unit 4 and a second electrical power supply unit 5 that is independent of the first power supply unit.

According to the example, the second electrically controllable pressure source 3 and the pressure modulation device 6 are implemented as in the first exemplary embodiment.

According to the second exemplary embodiment, the first control and regulating unit 112 or the first pressure source 102 is supplied with electrical energy from the first power supply unit 4 and the second control and regulating unit 13 or the second pressure source 3 is supplied with electrical energy from the second power supply unit 5. Means 45 are provided for supplying power to the third control and regulating unit 16 or the pressure modulation device 6 that enable the supply by means of the first power supply unit 4 or by means of the second power supply unit 5. In addition, supply by means of both power supply units can also be possible.

According to the example, wheel revolution rate sensors 99 as well as a sensor device 14 for detecting driving dynamics variables are provided, the signals of which are delivered to the control and regulating unit 16 and which are supplied with electrical energy from the control and regulating unit 16. An exchange of data between the third control and regulating unit 16 and the second control and regulating unit 13 is possible by means of the signal or data line 62.

The first electrically controllable pressure source 102 comprises a dual circuit master brake cylinder 7 according to the first exemplary embodiment, the pressure chambers 21, 23 of which are connected to the pressure modulation device 6 by means of hydraulic connections 26a, 26b. The pressure source 102 further comprises an electrically controllable brake force booster 108, which is connected upstream of the master brake cylinder 7.

According to the example, the brake force booster 108 comprises a hydraulic cylinder-piston arrangement, the piston 101 of which bounds a pressure chamber 103 and can be operated by a schematically indicated electromechanical actuator 109, for example an electric motor and a rotation-translation gearbox that is connected downstream. A rotor position sensor that is used for detecting the rotor position of the electric motor and that is only schematically indicated is denoted by the reference character 104. In addition, a temperature sensor 105 can also be used for detecting the temperature of the motor winding.

The brake pedal 10 of the braking system is mechanically couple to a piston 110 with an annular surface 111, which mechanically operates the first master brake cylinder piston 9 in the event of a displacement in the brake operating direction. The annular surface 111, with the housing 24, bounds a hydraulic chamber 107, wherein a pressure acting in the chamber 107 corresponds to a force acting on the first master brake cylinder piston 9 in the brake operating direction. The pressure chamber 103 of the cylinder-piston arrangement is connected to the chamber 107 by means of a connection 106, so that the master brake cylinder piston 9 can be operated by actuating the electromechanical actuator 109.

According to the example, two independent displacement sensors 25 and 27, which for example detect a displacement of the pistons 9 and 22, are associated with the first pressure source 102 and the signals thereof are transmitted by means of the signal or data line 28 to the second electronic control and regulating unit 13 that is associated with the second pressure source 3. Furthermore, a force sensor 113 that is associated with the first pressure source 102 detects a brake pedal operating force that is applied by the driver. The signals thereof are provided to the first electronic control and regulating unit 112 by means of a signal or data line 114.

Between the first and the second control and regulating units 112, 13 there is advantageously a signal or data line 29, for example a data bus, by means of which the units can exchange data and by means of which the first control and regulating unit 112 can transmit a condition status for the first pressure source 102 for example to the second control and regulating unit 13, as has been described above using the first exemplary embodiment of FIG. 1.

According to the second exemplary embodiment, a fourth electronic control and regulating unit 150 is provided, in which an autopilot function is carried out. Such a fourth control and regulating unit 150 can also be provided according to FIG. 1. According to the example, the fourth control and regulating unit 150 is connected to the first, second and third control and regulating units 112, 13, 16 by means of respective data busses 151, 152, 153. Instead of a data bus, a different data communications path is conceivable, for example a wireless transmission/connection.

Advantageously, the third control and regulating unit 16 takes care of all driving dynamics control tasks and the two other control and regulating units 12, 112; 13 only have the task of providing the two brake circuit pressures in the form of the modulator inlet pressures. The target pressure setting for the corresponding pressure regulator results from the braking intention of the driver and electronic autopilots as well as brake pressure demands of the driving dynamics ECU 16—for example for performing ESC or rollover prevention interventions.

It is provided that only the first pressure source is used with simple comfort braking, whereas the second pressure source always supports the build-up of the modulator inlet pressure if either the first pressure source has failed or the dynamics thereof or the maximum pressure thereof is not sufficient to service the brake pressure demand.

The driver informs the braking system of his intention to brake by means of the brake pedal force and the brake pedal travel. According to the legal regulations for motor vehicle brake systems, a further operating option is preferably provided, which is implemented for example by means of the operating element of an electrical parking brake.

The electronic autopilot may be implemented as a computer network that is located in the motor vehicle (fourth electronic control and regulating unit 150). However, it is also conceivable that the motor vehicle is remotely controlled. For example, a human operator or an external computer network could undertake the autopilot function, for example in order to park the vehicle in a car park. In any case the intention to brake by the autopilot must be reliably transferred to the braking system and reliably implemented there. For this purpose, it is advantageously provided that the autopilot's intention to brake is passed to the first and second control and regulating units 112, 13 on separate data communications paths (according to the example data buses 151, 152).

The exemplary embodiment of FIG. 2 even provides the possibility of carrying out the data transmission of the autopilot's intention to brake more reliably by passing the information to the third control and regulating unit 16 on a third independent data communications path (according to the example data bus 153).

In the braking systems according to the example there are two mutually independent instances with mutually independent power supplies (according to the example pressure source 2 or 102 with power supply unit 4 and pressure source 3 with power supply unit 5), which can provide hydraulic actuation energy for the operation of the wheel brakes 1 in a controlled manner.

In order to achieve the requirements for automated driving and in particular high availability of wheel-specific brake pressure regulation for assistance functions (such as for example ABS, ESC), the pressure modulation device 6 is hydraulically separated from the other hydraulic components and is equipped with a dedicated control and regulating unit 16. The redundant electrical power supply 4, 5 is used for automated driving in order to increase the availability of the assistance functions.

The two independent instances for the controlled provision of hydraulic actuation energy are essentially formed by an electrically controllable brake force booster 8 or 108 and an electrically controllable pressure booster 3.

It is sufficient to only supply the pressure modulation device 6 with electrical energy redundantly (4 and 5) and to supply the two pressure sources 2 (or 102), 3 singly in each case from different, mutually independent power supplies 4, 5.

The braking systems according to the example give the advantage that following the failure of one of the power supplies 4, 5 or one of the control and regulating units 12 (or 112), 13 of the power sources, there is still always a pressure source 2 (or 102) or 3 and the pressure modulation device 6 available to carry out the required safe braking function for automated driving.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

What is claimed is:

1. A braking system for a motor vehicle for operating hydraulic wheel brakes comprising:
    a first electrically controllable hydraulic pressure source for providing a brake pressure for operation of each of the wheel brakes;
    a second electrically controllable hydraulic pressure source for providing the brake pressure for operation of each of the wheel brakes;
    a first electrical power supply unit;
    a second electrical power supply unit that is independent of the first electrical power supply unit;
    an electrically controllable hydraulic pressure modulation device for setting wheel-specific brake pressures for the wheel brakes with at least one inlet valve that can be operated electrically for each of the wheel brakes;
    wherein the first hydraulic pressure source can be supplied with electrical energy exclusively by the first power supply unit, the second hydraulic pressure source can be supplied with electrical energy exclusively by the second power supply unit, the hydraulic pressure modulation device and the at least one inlet valve are supplied with electrical energy by the first power supply unit and the second power supply unit; and
    wherein the second hydraulic pressure source is hydraulically disposed between the first hydraulic pressure source and the hydraulic pressure modulation device.

2. The braking system of claim 1, further comprising: a first electronic control and regulating unit for actuating the first hydraulic pressure source; a second electronic control and regulating unit for actuating the second hydraulic pressure source; and a third electronic control and regulating unit configured to actuate the hydraulic pressure modulation device.

3. The braking system of claim 2, wherein the first electronic control and regulating unit is supplied with electrical energy by the first power supply unit, the second electronic control and regulating unit is supplied with electrical energy by the second power supply unit, and the third electronic control and regulating unit is supplied with electrical energy by either one of the first power supply unit and the second power supply unit.

4. The braking system of claim 2, further comprising wheel revolution rate sensors connected to the braking system, wherein signals of the wheel revolution rate sensors are received by the third electronic control and regulating unit.

5. The braking system of claim 2, wherein the first, the second and the third control and regulating units are connected to each other by data busses.

6. The braking system of claim 2, wherein at least one of the control and regulating units is connectable by a data communications path to a fourth electronic control and regulating unit in which an autopilot function is carried out.

7. The braking system of claim 6, wherein at least the first and the second control and regulating units are connectable to the fourth control and regulating unit by respective data communications paths.

8. The braking system of claim 1, further comprising a sensor device connected to the braking system, which detects a yaw rate of the motor vehicle, a lateral acceleration of the motor vehicle, and/or a longitudinal acceleration of the motor vehicle.

9. The braking system of claim 1, wherein the first controllable hydraulic pressure source comprises a master brake cylinder with an electrically controllable brake force booster connected upstream thereof.

10. The braking system of claim 9, wherein the electrically controllable brake force booster further comprises an electrically controllable electro-mechanical actuator with an electric motor and a translation-rotation gearbox, which operates a piston of the master brake cylinder.

11. The braking system of claim 9, wherein the electrically controllable brake force booster comprises a hydraulic cylinder-piston arrangement, the piston of which can be displaced by an electro-mechanical actuator, wherein the master brake cylinder can be operated by the cylinder-piston arrangement.

12. The braking system of claim 1, wherein the second hydraulic pressure source comprises an electrically controllable pressure booster with a motor-pump assembly and electrically operated valves for setting the brake pressures that are redirected to the hydraulic pressure modulation device.

* * * * *